United States Patent [19]

Ruddy et al.

[11] Patent Number: 5,064,605
[45] Date of Patent: Nov. 12, 1991

[54] APPARATUS FOR DETERMINING THE THERMAL HISTORY OF EQUIPMENT USING SOLID STATE TRACK RECORDERS

[75] Inventors: Francis H. Ruddy; Ezra P. Lippincott, both of Monroeville; Arnold H. Fero, Plum Borough; Roger B. Schreiber, Penn Township, Westmoreland County; John G. Seidel, McCandless, all of Pa.

[73] Assignee: Westinghouse Electric Corp., Pittsburgh, Pa.

[21] Appl. No.: 662,396

[22] Filed: Feb. 27, 1991

Related U.S. Application Data

[63] Continuation of Ser. No. 479,060, Feb. 1, 1990, abandoned.

[51] Int. Cl.$^5$ ............................................. G21C 17/00
[52] U.S. Cl. ..................................... 376/247; 376/245
[58] Field of Search .................. 376/245, 247; 374/57, 374/102, 103; 250/472, 390.03; 156/626, 628, 643

[56] References Cited

U.S. PATENT DOCUMENTS

| | | | |
|---|---|---|---|
| 3,941,629 | 3/1979 | Jaffe | 156/626 |
| 4,167,109 | 9/1979 | Gold | 73/15 R |
| 4,268,347 | 5/1981 | Stephens | 156/628 |
| 4,737,234 | 4/1988 | Ruddy | 156/626 |
| 4,744,938 | 5/1988 | Ruddy | 376/153 |
| 4,876,058 | 10/1989 | Fero et al. | 376/247 |
| 4,980,118 | 12/1990 | Fero et al. | 376/247 |

OTHER PUBLICATIONS

J. Roberts, R. Gold, F. Ruddy, "Thermal Annealing Studies in Muscovite and In Quartz," in *Solid State Nuclear Track Detectors*, (H. Francois, ed. 1980).

D. Storzer, "Fission Track Dating of Volcanic Glasses and the Thermal History of Rocks," Earth and Planetary Sciences Letters, vol. 8, No. 1, (1970).

D. Storzer, G. Wagner, "A Correction Method for Thermally Lowered Fission Track Ages," Radiation Effects, vol. 5, (1970).

G. Reimer, G. Wagner, B. Carpenter, "The Thermal Stability of Fission Tracks in the Standard Reference Material Glass Standard (National Bureau of Standards)", Radiation Effects, vol. 15 (1972).

S. Carfagno, R. Gibson, A Review of Equipment Aging Theory and Technology, EPRI Report NP-1558 §8.3 (1980).

R. Fleischer, H. Hart, "Fission Track Dating: Techniques and Problems," in *Calibration of Hominoid Evolution* (W. Bishop, A. Miller, ed. 1972).

Primary Examiner—Donald P. Walsh
Assistant Examiner—Meena Chelliah
Attorney, Agent, or Firm—Z. L. Dermer

[57] ABSTRACT

An apparatus is provided for determining the thermal history of an environment for purposes of monitoring thermal aging in equipment or the extent to which a process has proceeded. The apparatus comprises a plurality of solid state track recorders, and the range of activation energy values among the solid state track recorders encompasses the activation energy of the thermal aging process of the equipment to be monitored. Using Arrhenius functions, data obtained from the apparatus can be used to determine an equivalent average temperature which is combined with the equipment life data to determine the extent of thermal aging.

21 Claims, 4 Drawing Sheets

APPARATUS FOR DETERMINING THE THERMAL HISTORY OF EQUIPMENT USING SOLID STATE TRACK RECORDERS

This application is a continuation of application Ser. No. 07/479,060 filed Feb. 1, 1990, now abandoned.

BACKGROUND OF THE INVENTION

The invention concerns an apparatus for passively determining the thermal history of equipment by employing a combination of solid state track recorders ("SSTRs"). The apparatus is adapted to be used with a method disclosed in related application Ser. No. 07/481040, filed concurrently herewith, to determine an equivalent average temperature from which thermal aging of the equipment may be determined.

The properties of many materials undergo alteration as a result of exposure to temperature, for example, rubber gaskets may take a permanent set, flexible members may become brittle, organic fluids may decompose, electrical properties of insulating materials may vary, etc. This alteration in properties as a result of exposure to temperature is termed "thermal aging".

In nuclear power plants, many pieces of equipment, especially those concerned with the safety features of the plant, are "qualified." This qualification includes the determination of a qualified life, i.e. a maximum period of time for which the equipment may be placed in service. Due to the aforementioned thermal aging effect, the qualified life is a function of the temperature environment to which the equipment is subjected, as well as other factors, such as exposure to radiation. Some pieces of equipment may be comprised of various critical components each with its own qualified life. For maintenance purposes it is vital, therefore, to know when each piece of qualified equipment, or component therein, has reached its qualified life.

Theoretically, one could continuously measure and record the temperature to which each piece of qualified equipment was subjected (i.e. active temperature monitoring). This would allow the extent of thermal aging which the equipment had undergone, and therefore, the portion of its qualified life remaining, to be determined at any time. However, such an effort would be prohibitively costly, especially in certain areas of a nuclear power plant wherein high radiation levels make installing and maintaining temperature monitoring equipment difficult. A more common practice is to dispense with monitoring of the temperature environment by setting the qualified life conservatively low. This can be accomplished by assuming that the temperature is constantly maintained at the maximum foreseeable level for purposes of calculating the qualified life. However, this approach entails higher than necessary maintenance and equipment costs.

A second possible alternative to active monitoring would be to monitor the temperature environment of the equipment by passive means, thereby enabling the extent of thermal aging to be determined with less difficulty and expense. In a passive monitoring scheme, a passive temperature measuring device could be placed in close proximity to the equipment of interest so that the monitor would be subjected to the same temperature environment as the equipment. As a result of exposure to temperature, the device would undergo a detectable change (e.g., undergo thermal aging), the rate of this change being a known function of temperature. Typically, the higher the temperature the greater the rate of change. Since the extent of the change must be cumulative, such devices would be termed "integrating" thermal monitors. Since the period of time to which the device was exposed to the temperature environment would be known, and the temperature required to produce the observed change in such period of time is known, the temperature to which the device was exposed could be inferred by comparing the observed change to a calibration standard for the device. To date, no known suitable passive temperature monitor has been proposed.

One method for passive monitoring of a temperature environment, described in U.S. Pat. No. 4,167,109, involves the use of a solid state track recorder ("SSTR"). According to the patent, by determining the extent of annealing of the radiation "tracks" in the SSTR, the temperature to which the SSTR was exposed can be inferred. Unfortunately, use of SSTRs has been severely limited because no adequate means for relating extent of annealing to temperature exposure has heretofore been devised. As a result the use of SSTRs as devices for passive temperature monitoring, as described in Pat. No. 4,167,109, has never been developed. There use has been confined to limited situations such as where the temperature of the environment is known to be essentially constant, so that the temperature history could be inferred from a single SSTR.

Consequently, the need exists for an apparatus and method for determining the thermal aging of equipment using passive monitoring means which can be utilized in variable temperature environments. This need is satisfied in the current invention by constructing a passive temperature monitoring device comprised of a plurality of SSTRs. The data from such device can be analyzed using Arrhenius functions to obtain an equivalent average temperature. This equivalent average temperature is representative of the thermal history of the equipment and can be combined with thermal aging data for the equipment to determine its useful life.

The Arrhenius function has been used in the past to analyze the results of accelerated thermal aging tests, for example as disclosed in S. Carfagno and R. Gibson, *A Review of Equipment Aging Theory and Technology*, EPRI Equipment Aging Theory and Technologyov, EPRI Report, NP-1558, §8.3 (1980), and to analyze data from naturally occurring particle tracks in naturally occurring glasses for geological dating purposes, for example as disclosed in D. Storzer, "Fission Track Dating of Volcanic Glasses and the Thermal History of Rocks," in *Earth and Planetary Science Letters*, 8, pp 55-60 (1970. However, its use as described herein, to determine an equivalent average temperature obtained from passive devices which can be related to the thermal aging of the equipment being monitored, is believed to be new.

SUMMARY OF THE INVENTION

It is the general object of the invention to provide apparatus for determining the thermal aging of equipment using passive temperature monitoring means.

More specifically, it is an object of the current invention to provide an apparatus for determining an equivalent average temperature which is representative of the thermal history of the environment to which equipment is subjected.

It is a further object of the invention to ensure that the equivalent average temperature can be related to life data for the equipment.

According to the current invention, these objects are obtained by a passive thermal monitoring device comprised of a plurality of solid state track recorders ("SSTRs"). The thermal aging process to which each SSTR is subject is characterized by an Arrhenius function. The SSTRs are selected so that the Arrhenius function characterizing each SSTR is characterized by a different activation energy value. The range in activation energy values among the SSTRs encompasses the activation energy value characterizing the thermal aging process to which the equipment is subject.

The apparatus is employed by exposing the passive thermal monitoring device to the same environment as the equipment to be monitored. After exposure, each SSTR is "read" by quantifying the thermal aging which it has undergone. The extent of thermal aging is then compared to a calibration standard to obtain an equivalent average temperature, termed the Arrhenius equivalent temperature ("AET"), associated with the thermal aging of each SSTR An AET associated with the thermal aging of the equipment is then determined from the AET,s obtained from the SSTRs, by comparing the activation energy of the thermal aging process to which the equipment is subject to the activation energy values of the SSTRs.

DESCRIPTION OF THE PREFERRED EMBODIMENTS

Figure 1:
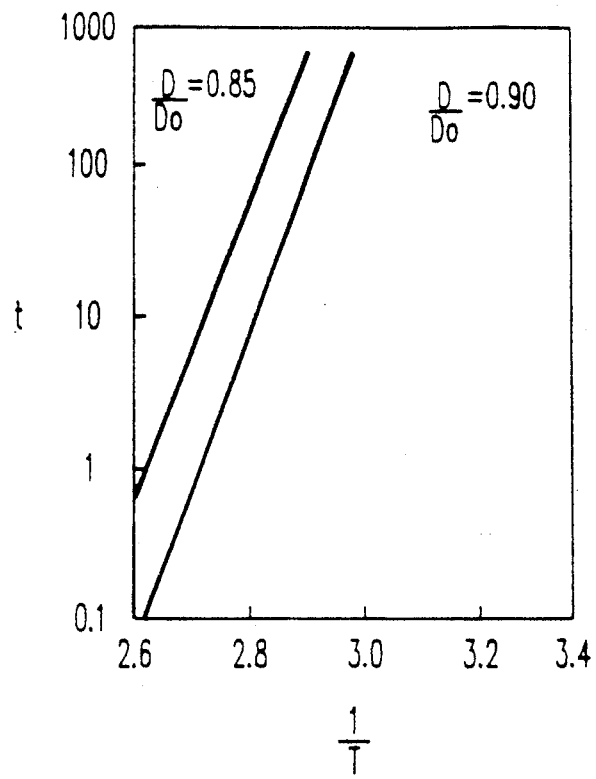
FIG. 1 is a graph of annealing data from the annealing of particle tracks formed by exposure of hard soda lime glass to isotope 252 of californium. The ordinate is time, in days, on a common log scale and the abscissa is the inverse of temperature, in $°K \times 10^{-3}$.

Many processes, especially those involving chemical reactions, occur at a rate which is dependent on temperature. It is well known that, in many cases, the manner in which the reaction rate varies with temperature can be a approximated by a function, originally developed by Arrhenius in the 19th century, as follows:

where:
$$R = Ae^{-E/kT}$$

R = the reaction rate
A = a constant, termed the frequency factor
E = the activation energy (eV)
k = Boltzmann's constant -continued T = temperature (°K)

In the Arrhenius function, the value of the activation energy E depends on the particular process. Thus, there are potentially an infinite number of Arrhenius functions, each characterized by a different value of the activation energy term. By varying the value of the activation energy term, an individualized Arrhenius function can be developed to characterize the temperature dependence of the reaction rate for any given process.

The processes associated with thermal aging of equipment can be characterized by Arrhenius functions, as evidenced by the fact that the Arrhenius model has often been used in accelerating aging tests (to extrapolate the results of short time exposure at high temperatures to obtain expected aging effects due to long time exposure at lower temperatures). Thus, the thermal aging process in the equipment to be monitored, for example, a piece of qualified equipment in a nuclear power plant, can be described by an Arrhenius function, characterized by an activation energy which represents the effect of temperature on the rate at which the particular aging process occurs. For example, 50% compression set in a gasket material might have an activation energy of 1.2 eV, whereas a 25% loss in lubricity of a lubricant might have an activation energy of 0.8 eV. The activation energy values in this example, which have been arbitrarily assigned for illustrative purposes only, would indicate that the rate of lubricity loss increases more rapidly with increasing temperature than does the rate of gasket compression set.

In general, the temperature of the environment to which equipment is subjected will vary over time. The thermal history of a particular environment can often be characterized by a histogram, for example, 6 months at 50° C., 2 months at 70° C., etc. Since, according to the Arrhenius model, temperature has an exponential effect on the thermal aging process, it is not possible to construct an average value representative of the thermal history which is applicable to all equipment exposed to such thermal history. Equipment in which the rate of thermal aging increases most rapidly with increasing temperature (i.e. equipment in which the aging process has a high activation energy) will have been affected more greatly by the higher temperatures in the thermal history than equipment in which the rate of aging is not so highly temperature dependent (i.e. those with low activation energies).

According to the current invention, this difficulty in characterizing a thermal history by use of an average temperature can be overcome by constructing an "equivalent" average temperature. The inventors denominate this equivalent average temperature the Arrhenius Equivalent Temperature ("AET") The AET is a quantity which represents the temperature which would be required to produce the thermal aging which has occurred if such thermal aging were the result of exposure to a constant temperature, rather than the variable temperature of the actual thermal history. If the thermal history of the environment were known exactly (i.e. through active temperature monitoring), the AET could be calculated using the Arrhenius function. The calculated AET would accurately characterize the thermal history with respect to any process the thermal aging of which is characterized by the same Arrhenius function as that used to calculate the AET (i.e. the same activation energy value).

An AET can also be obtained from a passive temperature measuring device, provided the process governing the thermal aging observed in such device can be characterized by an Arrhenius function. The AET is obtained by comparing the observed thermal aging of the passive temperature measuring device to a calibration standard which indicates the constant temperature exposure required to produce a similar extent of thermal aging. The AET for the equipment being monitored may then be inferred by interpolating among, or extrapolating from, the AET's obtained from several passive temperature measuring devices. This interpolation/extrapolation is performed by comparing the activation energy associated with the Arrhenius function characterizing the thermal aging process in the equipment with the activation energy values associated with the thermal aging process in each passive temperature measuring device.

The apparatus required to utilize such method, is described more fully below for a passive thermal monitoring device which utilizes SSTRs as the passive temperature measuring devices.

In general, a passive temperature measuring device may be created by exposing a member, formed from an appropriate material, to an altering agent. Such exposure produces an alteration in the member which undergoes a quantifiable change as a result of exposure to temperature (i.e., the member thus altered is subject to thermal aging). An SSTR is such a passive temperature measuring device. Basically, an SSTR is a member formed from a material, generally a dielectric material, in which, as explained further below, exposure to energetic charged particles results in the formation of observable "tracks" which anneal as a result of exposure to temperature. Basically then, an SSTR is utilized by exposing it to energetic charged particles, such as fission fragments or alpha particles, from a radiation source. The passage of these particles through the SSTR produces a permanent trail of radiation damage along the trajectory of each particle, termed a "track." As a result of this radiation damage, the track is subject to preferential attack by an etchant, thus rendering the track visible upon magnification. If the trajectory of the track were normally incident to the surface of the SSTR, the track would appear as a small round pit in the surface.

The radiation damage associated with the track reverses itself with exposure to temperature, a thermal aging process referred to as annealing. As a result of this phenomenon, annealed tracks, observed after etching, are smaller. Hence, this process is sometimes referred to as "track fading." Moreover, since the reduction in track size renders some tracks invisible, the density of the tracks is also reduced. Hence, the extent of track annealing (thermal aging) may be quantified by determining the reduction in the average track diameter or the reduction in the track density Calibration standards are created for each SSTR material by forming a number of test members from the material and exposing these test members to energetic charged particles. The tracks thus formed in the test members are then subjected to annealing at a variety of temperatures for a variety of times. The resulting data can be displayed in curves, such as those shown in FIG. 1 (constructed from annealing data from an SSTR formed from hard soda lime glass). The curves in FIG. 1 display the exposure time t required to produce a constant extent of track annealing $D/D_0$ (the ratio by which the diameter of the tracks decreased as a result of annealing) as a function of exposure temperature T. The inventors have determined that, in a number of materials suitable for SSTRs (identified in the table below), the track annealing process follows the Arrhenius model in that the extent to which the track annealing rate varies with temperature can be characterized by an Arrhenius function. Thus, plotting lines of constant diameter reduction ratio as the common log of time versus the reciprocal of the temperature in °K for such materials results in the series of straight lines shown in FIG. 1

Figure 2:
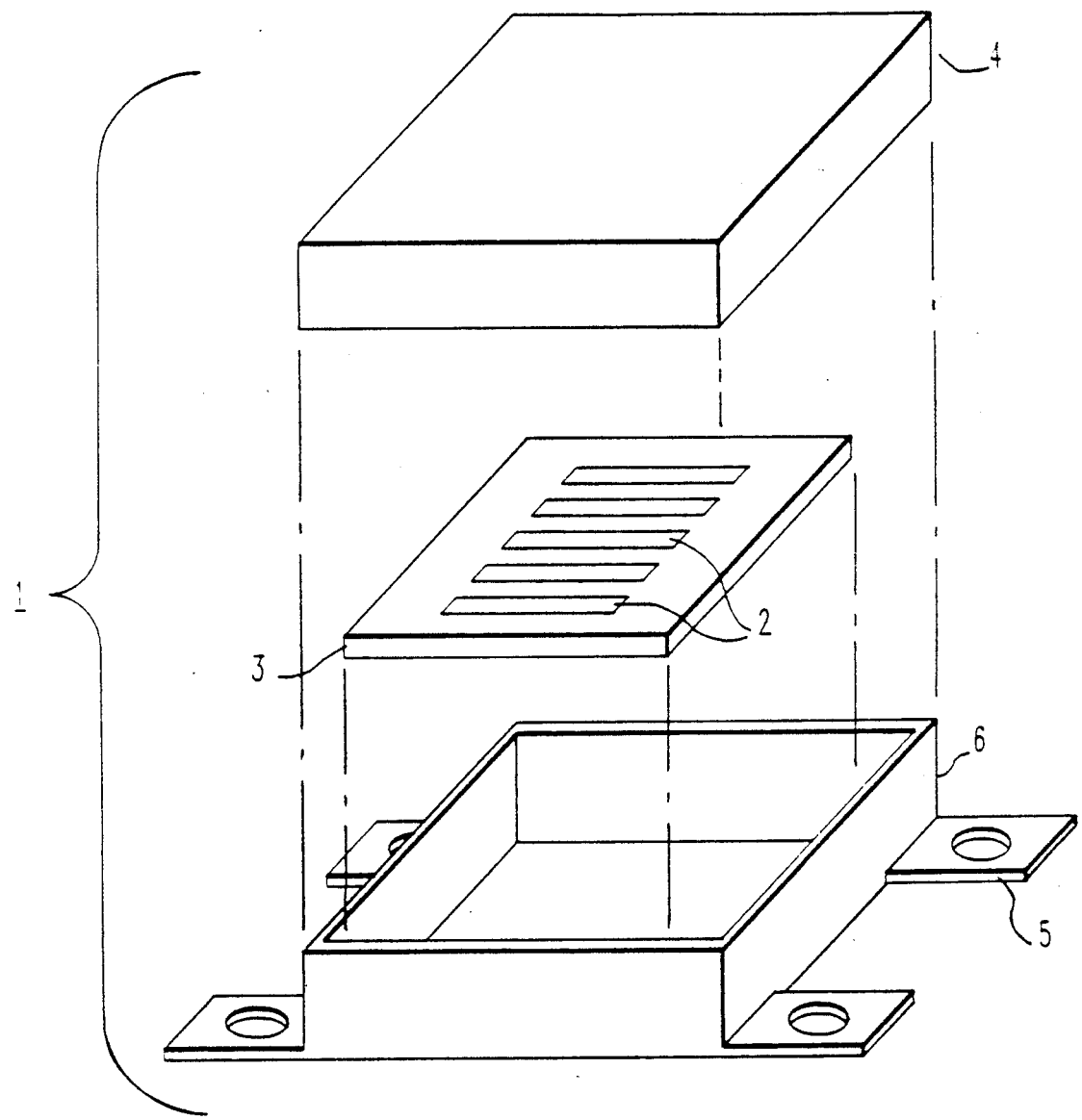
FIG. 2 is an exploded view of the passive thermal monitoring device.

Referring to FIG. 2, there is shown a passive thermal monitoring device 1 which is comprised of a plurality of SSTRs 2. Each SSTR consists of a thin strip of a dielectric material, preferably glass. It should be noted that certain plastics have activation energies and temperature sensitivities which make them suitable for thermal aging monitoring. However, unlike glass, their bulk etch rate is altered by exposure to beta or gamma radiation. As a result, the observed particle track diameters will be affected by in-service exposure to both radiation and temperature, leading to errors in temperature measurement. Hence, plastics may not be suitable for use in nuclear power plants unless the possibly synergistic effects of temperature and radiation are quantified, or unless they are used in areas with very low radiation levels.

The strips are fixed to a holding block 3 which may be injection molded plastic. The holding block is retained in an environmental enclosure having a cover 4 and a base 6, which may be made from stainless steel, and features mounting brackets 5 which allow the device to be conveniently bolted in close proximity to the equipment to be monitored. Reference is also made to U.S. Pat. No. 4,876,058, assigned to the same assignee, which shows construction of an Integrating Thermal Monitor which includes SSTR elements.

Since the activation energy associated with a given amount of annealing of radiation tracks is a characteristic of the material, in this invention the SSTRs are formed from a variety of different types of glass so that the range of their activation energies encompasses the activation energy of the thermal aging process of the equipment to be monitored. As indicated in the table below, materials have been identified which can provide the device with a range of activation energy values as high as 0.6-2.5 eV. Ideally, the SSTR materials should be selected so that the range of activation energies of the monitoring device is at least 0.5-1.5 eV. This range will encompass the activation energy of most of the thermal aging processes of interest. The monitoring device could be constructed using a single SSTR if its activation energy were sufficiently close to that of the thermal aging process of the equipment to be monitored, as discussed further below. However, it has been determined that is general at least three SSTRs should be used to obtain broad coverage and insure accurate interpolation of the results.

It is known in the prior art that if the extent of track annealing is characterized by the reduction in track density as represented by the ratio $n/n_o$ where $n_o$ and $n$ equal the number of tracks before and after annealing, respectively, the Arrhenius function can be manipulated to reveal:

$$\ln t = E/kT - \ln A + \ln (-\ln n/n_o)$$

In the practice of this invention, it is observed that the track diameter reduction ratio $D/D_o$ can be used in place of the track density reduction ratio $n/n_o$ to characterize the extent of annealing in the Arrhenius model. Thus, the formulation becomes:

$$\ln t = E/kT - \ln A + \ln(-\ln D/D_o)$$

Data generated from various SSTRs has indicated that the $D/D_o$ parameter yields straight lines when plotted in the form shown in FIG. 1, thereby validating this parameter as a means for characterizing the extent of annealing in the Arrhenius model. Moreover, inspection of the above equation indicates that when data is plotted as shown in FIG. 1, the value of the activation energy E can be deduced from the value of the slope of the constant $D/D_o$ lines, where the slope is equal to $E/k$. Using this technique, sufficient track annealing data has been generated to determine the activation energy of six SSTR materials, as follows:

| Material | Activation Energy (eV) |
| --- | --- |
| Green soda lime | 2.5 |
| Ophthalmic soda lime | 2.1 |
| Lead glass | 2.0 |
| White soda lime | 1.6 |
| Barium borosilicate | 0.64 |
| Aluminosilicate | 0.60 |

Figure 3:
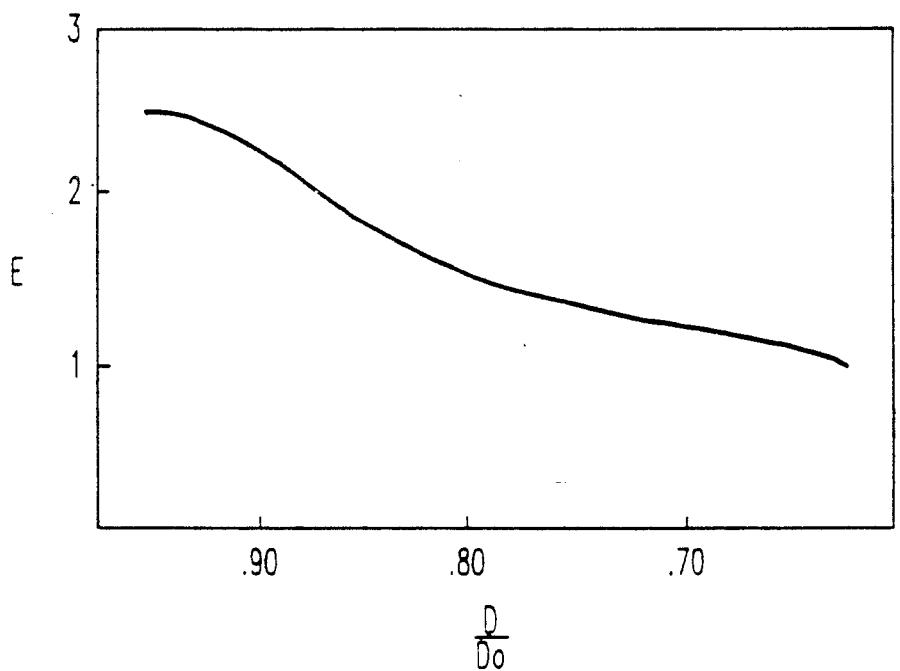
FIG. 3 is a schematic representation of the variation in activation energy with the extent of annealing. The ordinate is activation energy in eV and the abscissa is the extent of annealing in terms of the track diameter reduction ratio.

The activation energies above were determined for a diameter reduction ratio of 0.90. However, the effect of temperature on the rate of annealing varies as the annealing progresses, and thus the effective activation energy value varies with the extent of annealing. Thus, as shown in FIG. 3, different values are obtained for the activation energy at different diameter reduction ratios. It should be noted that by utilizing SSTRs made from each of the six materials listed in the table above, the range in activation energy value for the monitoring device will be 0.6–2.5 eV.

Activation energy is not the only characteristic that may be used to select the SSTR materials used in the practice of this invention. Different materials exhibit different particle track annealing characteristics as a function of temperature. While such temperature sensitivities are not well defined, the SSTRs can be selected with a view to having the temperature sensitivities of the respective SSTRs encompass the range of temperatures to which the equipment is to be subjected.

It has been found that the materials identified hereinabove are useful for long-term measurements in a relatively low temperature range such as 30°–60° C. Since most annealing data in the literature corresponds to temperatures above 100° C., this result was unanticipated. The discovery of the relatively low temperature usefulness of these materials lends itself to the important application of monitoring equipment components operated within the containment region of nuclear power reactors.

Once the materials for the monitoring device have been selected and SSTRs formed from such materials, half of each SSTR is exposed to energetic charged particles. The inventors have determined that exposure to isotope 252 of californium, in a vacuum, produces suitable particle tracks. Referring to FIG. 2, after exposure, the SSTRs 2 are placed in the holding block 3, which is then secured in the enclosure base 6. After installing the cover 4, the monitoring device is then placed in service by affixing it, preferably utilizing the mounting brackets 5, in close proximity to the equipment to be monitored.

After a predetermined period of time, which initially may be one fuel cycle in a nuclear power plant (approximately 1 to 2 years), the device will be removed from service and the data "read" as described below. Thereafter, the SSTRs will be replaced with fresh ones and the device is expected to remain in service until the equipment is nearing the end of its useful life, based on the temperature data obtained from the initial reading. Since the useful life is always conservatively determined, this second reading may indicate that the equipment has further life remaining. Since the useful life is more accurately determined, the cost of equipment replacement is minimized. Alternatively, in the event of an accident, the device can be read to determine what impact the short time exposure to higher than normal temperatures had on the thermal aging of the equipment.

In the preferred method, the SSTRs are read by exposing the previously unexposed half of each SSTR to energetic charged particles. Ideally, the method used to form the new tracks should be identical to that used in the original exposure, to ensure that the fresh tracks are the same size (or the same density if the density reduction ratio is used to determine the extent of annealing) as the tracks formed by the original exposure. However, sufficiently accurate results may be obtained by ensuring that both exposures are conducted by substantially similar methods (i.e., same type fission source used, same distance between fission source and SSTR, and conducting both exposures in a vacuum) After exposure, the entire SSTR is then etched to render the particle tracks visible upon magnification. By comparing a characteristic dimension of the annealed tracks in the initially exposed half to the same dimension for the new tracks in the recently exposed half, the extent of annealing can be quantified. Preferably, this characteristic dimension should be the track diameter. The extent of annealing can then be quantified by determining the ratio of the reduction in track diameters, $D/D_0$. Alternatively, isotropic track exposures can be used and by comparing the number of tracks remaining in the annealed portion with those in the unannealed portion, the reduction in track density can also be used to quantify the extent of annealing.

As previously mentioned, the particle tracks must be etched to render them visible. This is accomplished by subjecting the SSTR to an etchant which attacks the particle tracks at a rate faster than that with which it attacks the bulk material. The rapidity with which the etchant attacks is called the etch rate. Thus, in order for the particle tracks to be visible, the track etch rate must be greater than the etch rate in the bulk material. Although the track etch rate actually varies along the track, by using the simplifying assumption of a constant track etch rate it can be shown that the diameter of the track is related to the etch rates through the following equation:

$$D = 2 V_B t^* [(V_T/V_B - 1)(V_T/V_B + 1)]^{\frac{1}{2}}$$

where D equals etched track diameter, $t^*$ equals etch time, and $V_T$, $V_B$ equal etch rates in the track and bulk material, respectively.

Figure 4:
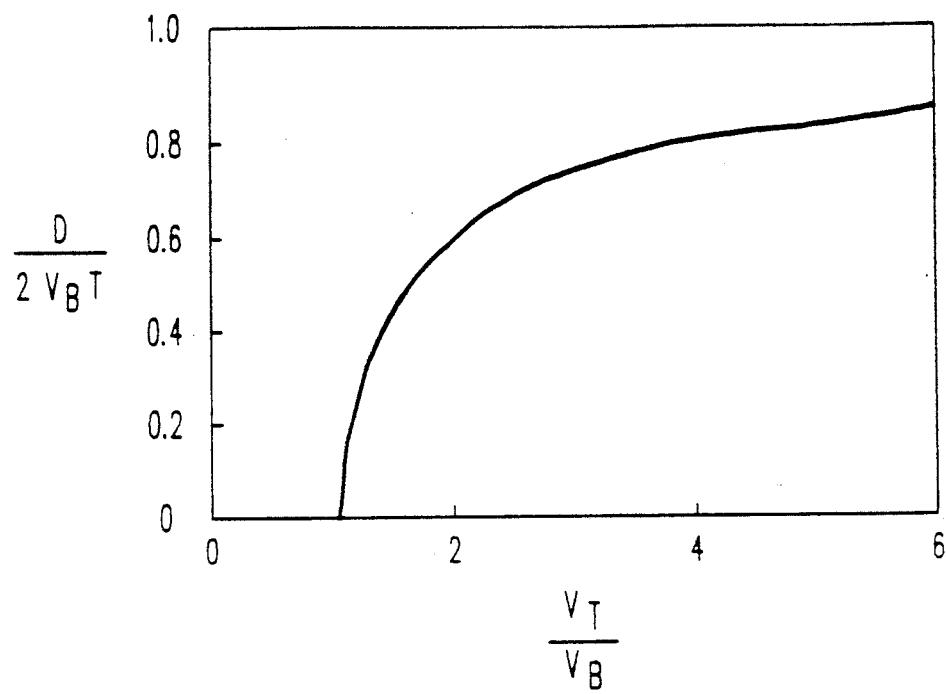
FIG. 4 is a schematic representation of the relationship of the etched track diameter D to the ratio of track to bulk etch rates $V_T/V_B$.

A plot of $D/2 V_B t^*$ based on this relationship is shown in FIG. 4 and reveals that the track diameter is strongly dependent on the track etch rate at ratios of track to bulk etch rates less than four. Thus, etching is most advantageously done with an etchant in which the rate of etching along the track exceeds the rate of etching in the bulk material by a factor of at least four. The inventors have found that for the SSTR materials listed in the table above, etching with a 5% solution of hydrofluoric acid at room temperature for 5-20 minutes produces satisfactory results.

Figure 5:
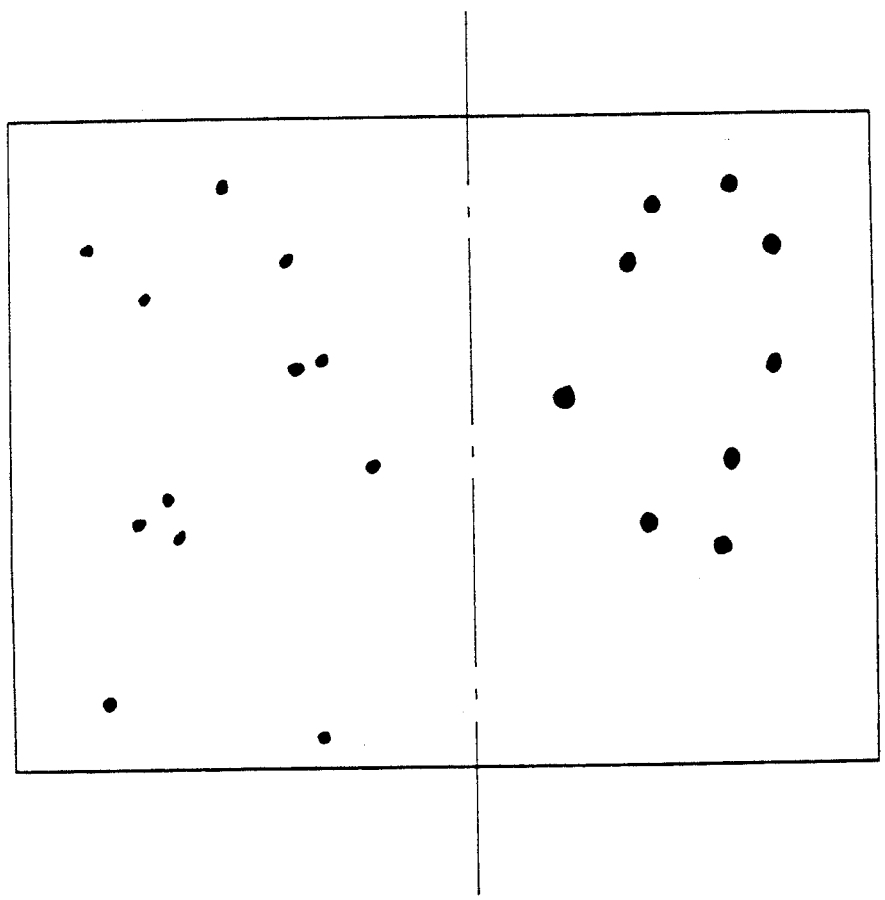
FIG. 5 is a schematic representation of annealed and unannealed tracks in hard soda lime glass after etching.

There is shown in FIG. 5 a schematic representation of a photomicrograph of annealed and unannealed tracks in hard soda lime glass after etching. The tracks were produced by exposure to isotope 252 of californium and annealing was done by subjecting the SSTR to 100° C. for 14.1 days. The portion to the right of line V-V represents the unannealed tracks, the portion to the left, the annealed tracks.

According to the method for reading SSTRs taught by the prior art, i.e. U.S. Pat. No. 4,167,109, the extent of annealing was determining by initially exposing two SSTRs to energetic charge particles. One SSTR was placed in service and the other was maintained in a temperature controlled environment at a temperature low enough to produce neglible annealing. When it was desired to read the SSTR in service, both were etched and the extent of annealing determined by determining the difference between the particle tracks in the two SSTRs. The inventors have determined that the method of reading SSTRs in the current invention is superior to the prior art method. This is so because variations in batches of ostensibly identical SSTR materials, and the inability to insure that no annealing occurs in the control SSTR, would produce unacceptable errors in the prior art method. These errors are eliminated in the method disclosed herein, in which both the annealed and unannealed tracks are formed in a single SSTR.

After the SSTRs have been read (i.e. the extent of annealing determined and quantified as $D/D_o$), an AET associated with each SSTR is determined by constructing a calibration curve similar to that shown in FIG. 1 using calibration data corresponding to the $D/D_o$ obtained by each SSTR (a different calibration curve is drawn for each SSTR material). The AET is determined for each SSTR by entering each graph for the period of time over which the SSTR was in service and reading the corresponding temperature. Each AET is an equivalent average temperature representative of the thermal aging to which each SSTR was subjected. This AET is applicable to any thermal aging process with an activation energy equal to that of the track annealing process in the SSTR.

After the AET is determined, the activation energy value for each SSTR is simply obtained from the slope of the log t versus 1/t plot for each SSTR. The AET associated with the thermal aging of the equipment is then determined by relating the activation energy of the equipment to the activation energies of the SSTRs. The activation energy characterizing the Arrhenius function characterizing the thermal aging process in the equipment is often supplied by the equipment designer along with the qualification data for the equipment. Alternatively, the activation energy can be determined from equipment life data plotted in a manner similar to FIG. 1, the activation energy being the slope of the log t versus 1/T curve.

Figure 6:
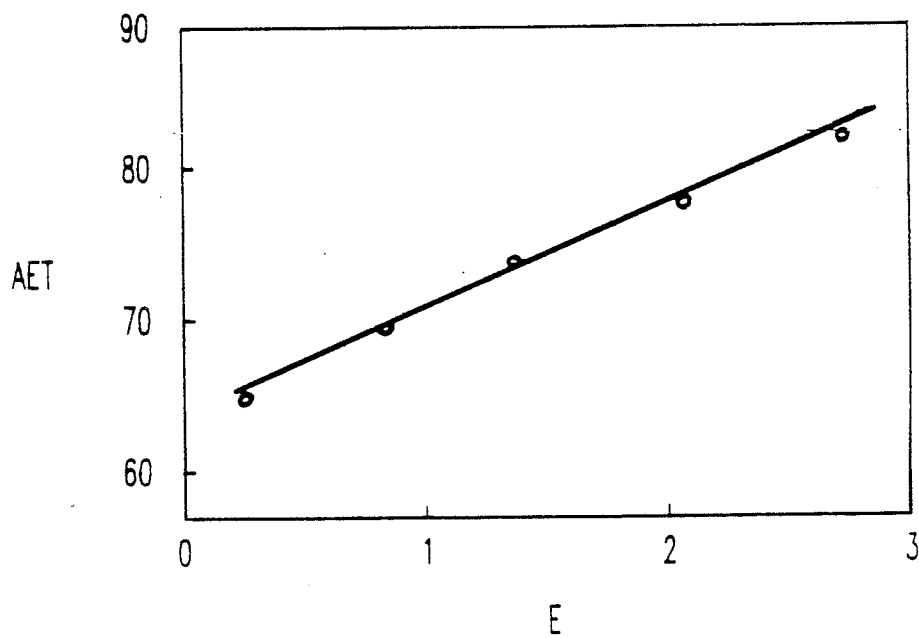
FIG. 6 is a schematic representation of Arrhenius equivalent temperature versus activation energy, obtained from a group of SSTRs after exposure to a temperature environment.

The determination of the AET associated with the equipment can be accomplished by constructing a plot of AET versus activation energy for the SSTRs, such as that shown in FIG. 6. The AET associated with the thermal aging of the equipment is determined by interpolation (or extrapolation if the activation energy of the equipment is outside the range of activation energies of the SSTRs comprising the monitoring device), by entering the graph at the activation energy of the thermal aging process in the equipment and reading the indicated temperature.

The AET associated with the thermal aging of the equipment can then be combined with equipment life data to determine its remaining life. Typically, equipment life data is represented by a curve of useful life versus temperature. Such curves are usually generated by exposing the equipment to a constant temperature and noting when failure occurs. This procedure may be repeated a number of times at various temperatures to determine the slope of the useful life versus temperature curve. Often, it is desired to conduct accelerated aging tests in order to reduce the time required to obtain the life data. The Arrhenius function may be utilized to interpret and extrapolate accelerated aging test data as explained in S. Carfagno and R. Gibson, *A Review of Equipment Aging Theory and Technology*, EPRI Report, NP-1558, §8.3 (1980). In any case, since, as previously discussed, the AET determined by the method disclosed herein is representative of the thermal aging which the equipment would have undergone had it been subjected to a constant temperature environment, the remaining useful life may be determined by entering the useful life versus temperature curve for the equipment at the determined AET and the known exposure time and noting the remaining life.

The invention described above produces AET's which span a range of activation energy values as a result of employing a plurality of SSTRs in a single thermal monitoring device. This ensures that the AET associated with the equipment will be accurate, since its activation energy will be encompassed by the range of activation energy values of the SSTRs. It also allows a single monitoring device to be used to monitor the temperature environment of several pieces of equipment, each with its own activation energy value.

However, it is possible to use the principles disclosed herein with a monitoring device employing a single SSTR. In this case, the activation energy value of the SSTR should be fairly close to that of the equipment to be monitored. The extent to which the activation energy of the SSTR can deviate from that of the equipment depends on the desired accuracy of the final AET (that is, the AET associated with the equipment) which will be obtained by utilizing the method. The desired accuracy will depend on the criticality of the equipment to be monitored and the extent to which its useful life is temperature dependent.

Once the desired accuracy, expressed as a temperature tolerance, has been obtained, the acceptable activation energy tolerance can be determined by devising a histogram based on a best estimate of the thermal environment to be encountered. Using this histogram and the Arrhenius function, AET's can be calculated for a variety of activation energy values so that a curve of AET versus E, such as that shown in FIG. 6, can be plotted. The slope of the AET versus E line will determine the acceptable activation energy tolerance for a given temperature tolerance (i.e. if the slope were 1°

C./0.01 eV and the temperature tolerance were ±5 C., then the activation energy tolerance would be +0.05 eV). A single SSTR can then be used to monitor the thermal history, provided its activation energy value falls within the tolerance. In the example above, if the activation energy value of the equipment was 1.0 eV then a single SSTR would produce a result with the desired accuracy if its activation energy was in the 0.95–1.05 eV range. Since the validity of the activation energy tolerance obtained as described above depends on the accuracy with which the thermal history can be predicted, a high degree of uncertainty concerning the temperature environment should be compensated for by tightening the temperature tolerance.

Although the invention has been explained as applicable in a nuclear power plant, the invention is equally applicable to any situation in which it is desired to passively determine the thermal environment to which equipment is subjected, provided the temperature dependence of the equipment can be characterized by an Arrhenius function. In this regard, it should be noted that the Arrhenius formulation has been used to determine failure probabilities in aircraft electronics exposed to elevated temperatures.

Lastly, the invention is explained as applied to determining an equivalent average temperature associated with a thermal aging process in equipment. However, the invention can be used to determine an equivalent average temperature associated with any process whose reaction rate can be characterized by an Arrhenius function of temperature, whether or not such process causes thermal aging in equipment, so long as the thermal monitoring device can be situated so that it is subjected to the same temperature environment as the constituents involved in the process and so long as the process being monitored does not interfere with the track annealing process in the SSTRs.

The scope of the invention is illustrated by the example of compounds A and B that react over a period of time to produce compound C. Where it is known that the process by which this occurs is dependent on the temperature to which A and B are subjected, then it is desirable to determine the temperature at which the process occurred so that the amount of C produced can be calculated. For a process where the reaction rate of the process can be characterized by an Arrhenius function, the invention can be applied to obtain an AET associated with the process. In this case, the activation energy of the process under study, rather than that of the thermal aging of equipment, is used to interpolate among the AET's from the passive temperature measuring devices. The AET associated with the process is then be used to determine the extent to which the process occurred - in the example, the amount of C produced.

We claim:

1. Apparatus for use in determining an equivalent average temperature associated with the thermal aging of equipment subjected to a variable temperature environment having a predetermined range of temperatures, the rate at which said thermal aging occurs being capable of being characterized by an Arrhenius function of temperature for said equipment, said equipment Arrhenius function characterized by an equipment activation energy value, comprising:
    a plurality of solid state track recorders (SSTRs), each characterized by a plurality of particle tracks formed therein, said particle tracks being subject to annealing within said temperature range, the rate at which said annealing occurs in each of said SSTRs being characterized by a respective SSTR Arrhenius function of temperature, each of said SSTR Arrhennius functions being characterized by an SSTR activation energy value, at least two of said SSTRs formed from different materials such that the range of said SSTR activation energy values among said SSTRs encompasses said equipment activation energy value; and
    housing means for housing said plurality of SSTRs so that they can be maintained together in said variable temperature environment.

2. The apparatus according to claim 1 wherein said housing means comprises a holding block and each of said SSTRs is fixed thereto, said holding block being disposed in an enclosure, said enclosure having means for mounting in close proximity to said equipment.

3. The apparatus according to claim 1 wherein said equipment is a piece of qualified equipment operating in a nuclear power plant.

4. The apparatus according to claim 1 wherein each of said SSTRs is formed from a dielectric material.

5. The apparatus according to claim 1 wherein one of said SSTRs is formed from green soda lime glass.

6. The apparatus according to claim 1 wherein one of said SSTRs is formed from ophthalmic soda lime glass.

7. The apparatus according to claim 1 wherein one of said SSTRs is formed from lead glass.

8. The apparatus according to claim 1 wherein one of said SSTRs is formed from white soda lime glass.

9. The apparatus according to claim 1 wherein one of said SSTRs is formed from barium borosilicate.

10. The apparatus according to claim 1 wherein one of said SSTRs is formed from aluminosilicate.

11. The apparatus according to claim 1 where said range of activation energy values among said SSTRs is at least 0.6 to 1.5 eV.

12. The apparatus according to claim 2 wherein said particle tracks are tracks formed by exposure to an isotope of californium.

13. In a nuclear power plant having equipment subject to thermal aging, the rate of said thermal aging being capable of characterization by at least one equipment Arrhennius function of temperature, said equipment being subjected to a temperature environment having a predetermined range of temperatures, apparatus for determining the thermal aging which has occurred in said equipment comprising:
    a plurality of passive sensors, each of said sensors being formed from a selected material and subject to a thermal aging process within said range of temperatures, the extent of said thermal aging in each respective sensor being quantifiable, the rate at which said thermal aging process progresses in each of said sensors being characterized by a respective Arrhenius function of temperature; and
    said selected material not being the same for each of said sensors, whereby the range of activation energy values characterizing said respective Arrhenius functions encompasses the activation energy value characterizing said equipment Arrhenius function.

14. Apparatus for determining an equivalent average temperature associated with the thermal aging of equipment subjected to a variable temperature environment having a predetermined range of temperatures, the rate at which said thermal aging occurs being characterized by a first Arrhenius function, said first Arrhenius function being characterized by a first activation energy value comprising:
  at least one SSTR having a plurality of particle tracks formed therein, said particle tracks being subject to annealing when exposed to temperatures within said temperature range, the rate at which said annealing occurs in said SSTR being characterized by a second Arrhenius function of temperature;
  said second Arrhenius function being characterized by a second activation energy value, said second activation energy value being within a predetermined tolerance around said first activation energy value.

15. The apparatus according to claim 14 wherein said SSTR is formed from green soda lime glass.

16. The apparatus according to claim 14 wherein said SSTR is formed from ophthalmic soda lime glass.

17. The apparatus according to claim 14 wherein said SSTR is formed from lead glass.

18. The apparatus according to claim 14 wherein said SSTR is formed from white soda lime glass.

19. The apparatus according to claim 14 wherein said SSTR is formed from barium borosilicate.

20. The apparatus according to claim 14 wherein said SSTR is formed from aluminosilicate.

21. The apparatus according to claim 14, wherein said SSTRs are selected to have their temperature sensitivities encompass said temperature range.

* * * * *